US012284505B2

(12) United States Patent
Wang et al.

(10) Patent No.: US 12,284,505 B2
(45) Date of Patent: Apr. 22, 2025

(54) SPEAKER

(71) Applicant: MERRY ELECTRONICS (SUZHOU) CO., LTD., Suzhou (CN)

(72) Inventors: Jingui Wang, Suzhou (CN); MingYa Luo, Suzhou (CN)

(73) Assignee: MERRY ELECTRONICS (SUZHOU) CO., LTD, Suzhou (CN)

( * ) Notice: Subject to any disclaimer, the term of this patent is extended or adjusted under 35 U.S.C. 154(b) by 307 days.

(21) Appl. No.: 17/895,206

(22) Filed: Aug. 25, 2022

(65) Prior Publication Data

US 2023/0292052 A1 Sep. 14, 2023

(30) Foreign Application Priority Data

Mar. 11, 2022 (CN) ......................... 202210241728.8

(51) Int. Cl.
*H04R 9/02* (2006.01)

(52) U.S. Cl.
CPC .................................... *H04R 9/025* (2013.01)

(58) Field of Classification Search
None
See application file for complete search history.

(56) References Cited

U.S. PATENT DOCUMENTS 11,632,609 B1 * 4/2023 Lee ...................... H04R 1/2819 381/332
2015/0358705 A1 12/2015 Chen et al.
2017/0280247 A1 9/2017 Kobayashi et al.
2021/0368272 A1 * 11/2021 Wang ...................... H04R 9/06

FOREIGN PATENT DOCUMENTS

| | | | |
|---|---|---|---|
| CN | 205081965 | U | 3/2016 |
| CN | 209593747 | U | 11/2019 |
| CN | 111163409 | A | 5/2020 |
| CN | 210986334 | U | 7/2020 |
| JP | 2002-191093 | A | 7/2002 |
| JP | 2002-354580 | A | 12/2002 |

* cited by examiner

*Primary Examiner* — Paul W Huber
(74) *Attorney, Agent, or Firm* — Birch, Stewart, Kolasch & Birch, LLP

(57) ABSTRACT

The present disclosure provides a speaker, comprising a housing, a carrying board, a magnetic component, a magnetic conductive component, a voice coil, and a diaphragm component. The housing comprises an accommodating space and a rear cavity space communicated with the accommodating space. An area in the accommodating space communicating with the rear cavity space is an airflow area. The carrying board is disposed in the accommodating space. The magnetic component is disposed on the carrying board. The magnetic conductive component is disposed at the magnetic component. The voice coil is disposed in the magnetic component and the magnetic conductive component. The diaphragm component is disposed in the accommodating space, and is connected to the voice coil. Wherein, the magnetic component disposed in the airflow area comprises a first demagnetization configuration or/and the magnetic conductive component disposed in the airflow area comprises a second demagnetization component.

9 Claims, 10 Drawing Sheets

SPEAKER

CROSS-REFERENCE TO RELATED APPLICATION

This application claims the priority benefit of Chinese Patent Application Serial Number 202210241728.8, filed on Mar. 11, 2022, the full disclosure of which is incorporated herein by reference.

BACKGROUND

Technical Field

The present disclosure relates to the technical field of sound-source vibration sound-generating assemblies, particularly to a speaker.

Related Art

The operating principle of conventional speaker in the prior art is: an energized conductor is subjected to a force in the magnetic field, then alternated electric current passes through the voice coil to generate a corresponding magnetic field change, causing diaphragm of the speaker to vibrate surrounding air for sounding. However, the vibration of surrounding air caused by the speaker diaphragm vibration is also disturbed by the airflow nearby. According to the design of the housing of the speaker, when the airflow space where the diaphragm vibrates is connected to the space of other cavities, due to the airflow around the voice coil and around the diaphragm are inconsistent, the vibration amplitude of the voice coil and of the diaphragm would be inconsistent, so the acoustic performance would be affected.

SUMMARY

The embodiments of the present disclosure provide a speaker tended to solve the problem that the acoustic performance of conventional speaker is affected due to the inconsistency of vibration amplitude of the voice coil.

The present disclosure provides a speaker, comprising a housing, a carrying board, a magnetic component, a magnetic conductive component, a voice coil, and a diaphragm component. The housing comprises an accommodating space and a rear cavity space. The accommodating space is communicated with the rear cavity space. An area in the accommodating space communicating with the rear cavity space is an airflow area. The carrying board is disposed in the accommodating space. The magnetic component is disposed on the carrying board. The magnetic conductive component is disposed at the magnetic component. The voice coil is disposed in the magnetic component and the magnetic conductive component. The diaphragm component is disposed in the accommodating space and is connected to the voice coil. Wherein, the magnetic component disposed in the airflow area comprises a first demagnetization configuration or/and the magnetic conductive component disposed in the airflow area comprises a second demagnetization component. In this embodiment, the vibration amplitude of each area of the voice coil could be balanced by the demagnetization components for excellent acoustic performance.

In one embodiment, an area outside the airflow area of the accommodating space is a non-airflow area. In the case where the airflow area and the non-airflow area have the same size, a magnetic flux of the magnetic component and the magnetic conductive component disposed in the airflow area is smaller than a magnetic flux of the non-airflow area.

In one embodiment, the magnetic component comprises a main magnetic body and a plurality of secondary magnetic bodies disposed on the periphery of the main magnetic body. A first gap exists between the main magnetic body and the plurality of secondary magnetic bodies. The voice coil is disposed in the first gap. The main magnetic body or/and the plurality of secondary magnetic bodies in the airflow area comprise the first demagnetization component.

In one embodiment, the first demagnetization component of the main magnetic body is a through hole or/and a notch disposed at the main magnetic body in the airflow area.

In one embodiment, the first demagnetization component among the plurality of secondary magnetic bodies reduces the volume of the plurality of secondary magnetic bodies in the airflow area.

In one embodiment, the magnetic conductive component corresponds to the magnetic component. The magnetic conductive component comprises a main magnetic conductive member and a plurality of secondary magnetic conductive members. The plurality of secondary magnetic conductive members are disposed at the periphery of the main magnetic conductive member. A second gap exists between the main magnetic conductive member and the plurality of secondary magnetic conductive members. The voice coil is disposed in the second gap. The main magnetic conductive member or/and the plurality of secondary magnetic conductive members in the airflow area comprise the second demagnetization component.

In one embodiment, the second demagnetization component of the main magnetic conductive member is a through hole or/and a notch disposed at the main magnetic conductive member in the airflow area.

In one embodiment, the second demagnetization component among the plurality of secondary magnetic conductive members reduces the volume of the plurality of secondary magnetic conductive members in the airflow area.

In one embodiment, the first demagnetization component corresponds to the second demagnetization component.

In one embodiment, the diaphragm component comprises a ball top part and a folded ring part. The folded ring part is connected to the voice coil. The ball top part is disposed at one side of the folded ring part away from the voice coil.

The present disclosure provides a speaker, the housing of which comprises an accommodating space and a rear cavity space. The accommodating space is communicated with the rear cavity space. An area in the accommodating space communicating with the rear cavity space is an airflow area. The accommodating space accommodates the magnetic component, the magnetic conductive component, the voice coil and the diaphragm component. Wherein, the magnetic component disposed in the airflow area comprises a first demagnetization configuration or/and the magnetic conductive component disposed in the airflow area comprises a second demagnetization component. In this embodiment, the vibration amplitude of each area of the voice coil could be balanced by reducing magnetic flux of the magnetic conductive component and of the magnetic component in the airflow area by the first demagnetization component and the second demagnetization component for excellent acoustic performance.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
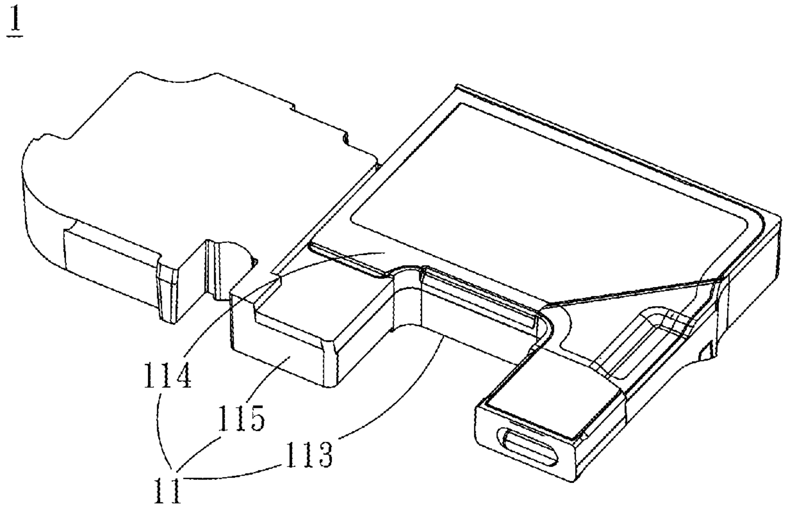
FIG. 1 is a perspective view of a speaker of the first embodiment of the present disclosure.
Figure 2:
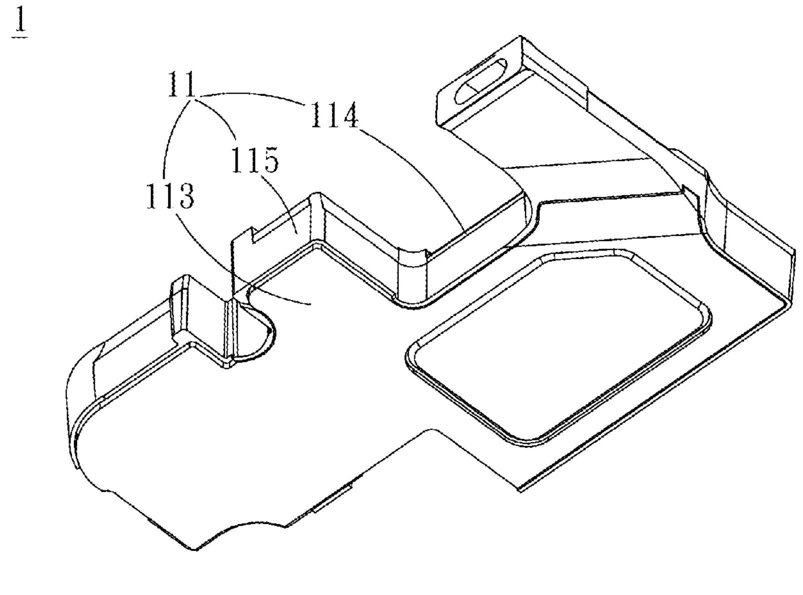
FIG. 2 is another perspective view of the speaker of the first embodiment of the present disclosure.
Figure 3:
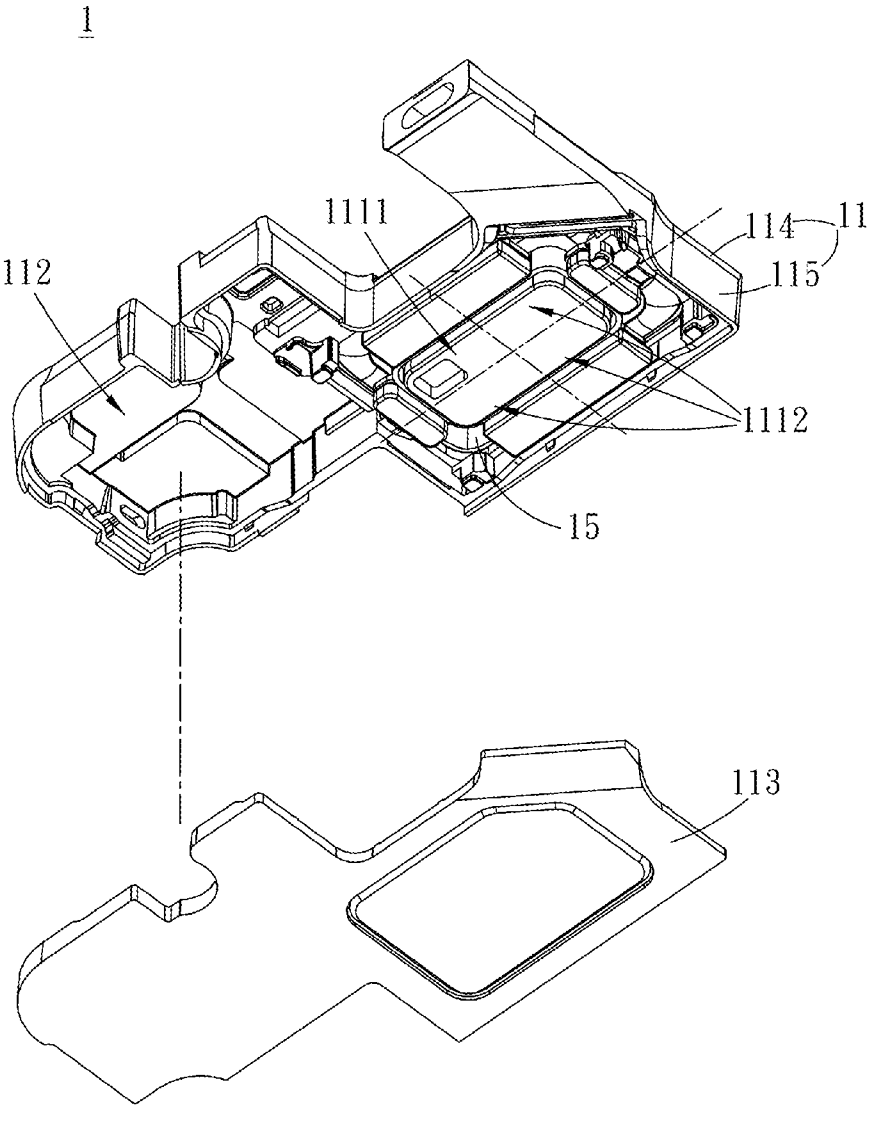
FIG. 3 is an exploded view of the speaker of the first embodiment of the present disclosure.
Figure 4:
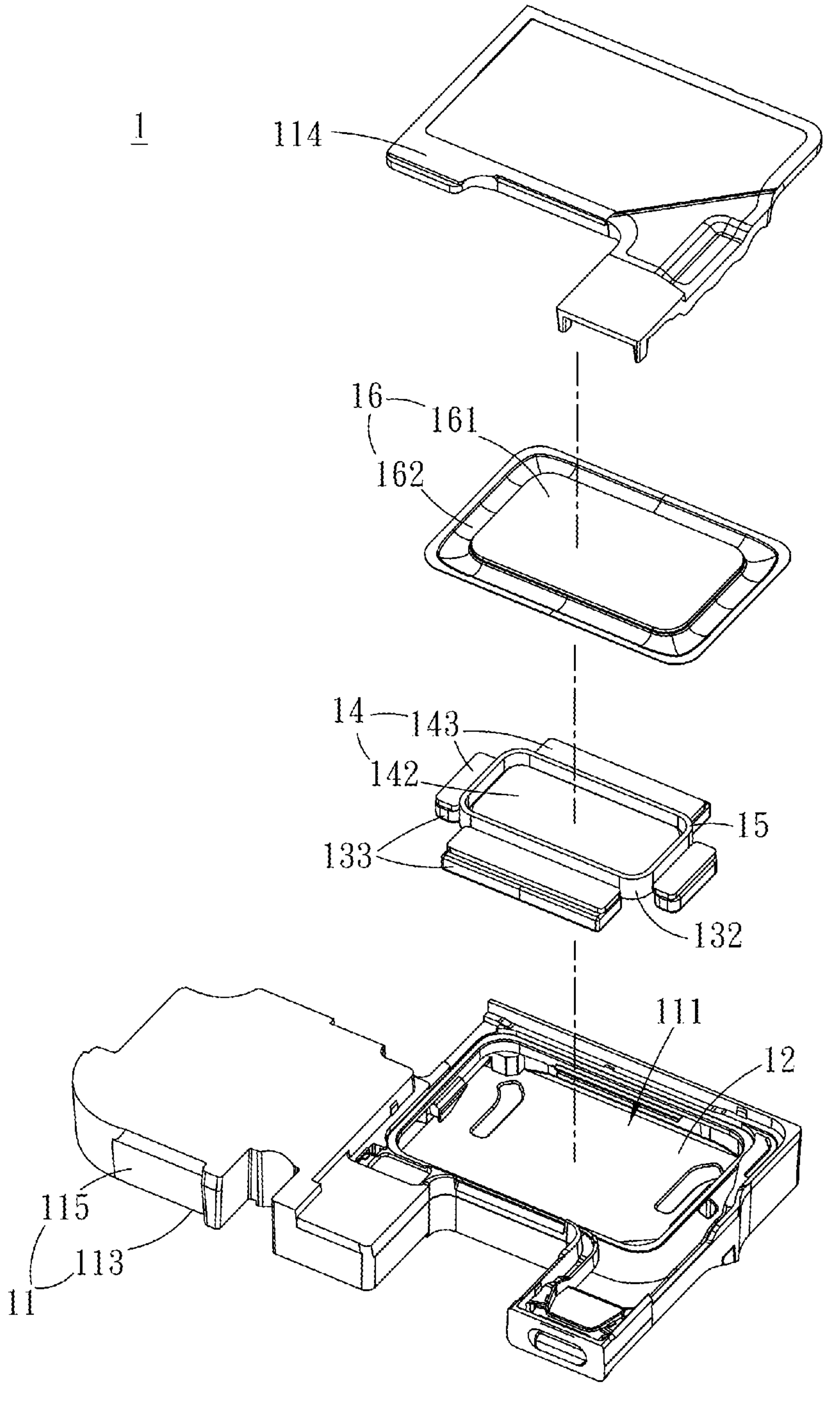
FIG. 4 is another exploded view of the speaker of the first embodiment of the present disclosure.
Figure 5:
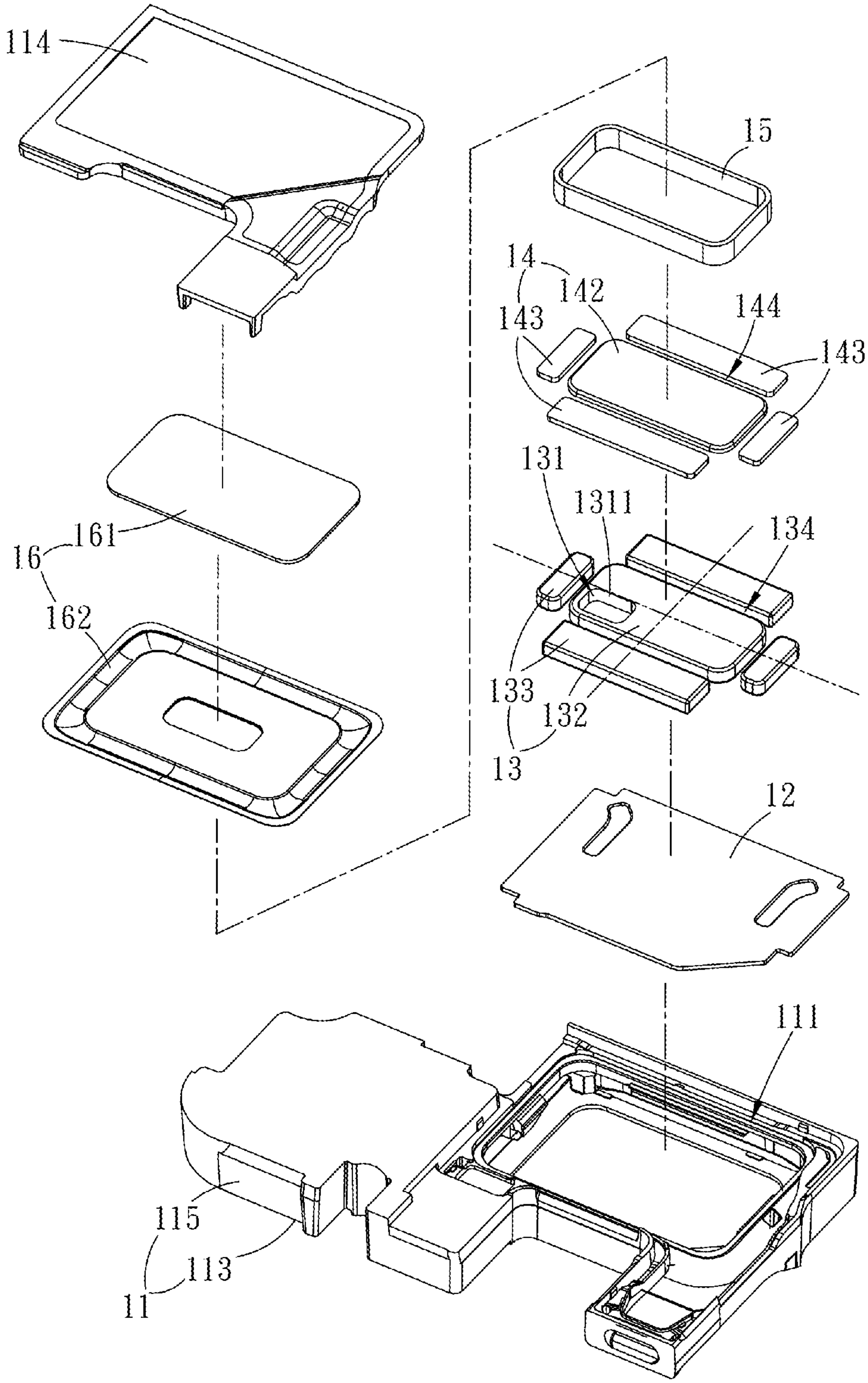
FIG. 5 is yet another exploded view of the speaker of the first embodiment of the present disclosure.

FIG. 1 and FIG. 2 are perspective views of a speaker of the first embodiment of the present disclosure. FIG. 3 to FIG. 5 are exploded views of the speaker of the first embodiment of the present disclosure. As shown in the figures, the present disclosure provides a speaker 1, which comprises a housing 11, a carrying board 12, a magnetic component 13, a magnetic conductive component 14, a voice coil 15 and a diaphragm component 16. The housing 11 comprises an accommodating space 111 and a rear cavity space 112. The accommodating space 111 is communicated with the rear cavity space 112. An area in the accommodating space 111 communicating with the rear cavity space 112 is an airflow area 1111. The carrying board 12 is disposed in the accommodating space 111. The magnetic component 13 is disposed on the carrying board 12. The magnetic conductive component 14 is disposed at the magnetic component 13. The voice coil 15 is disposed in the magnetic component 13 and the magnetic conductive component 14. The diaphragm component 16 is disposed in the accommodating space 111 and is connected to the voice coil 15. Wherein, the magnetic component 13 disposed in the airflow area 1111 comprises a first demagnetization configuration 131 or/and the magnetic conductive component 14 disposed in the airflow area 1111 comprises a second demagnetization component 141.

The magnetic component 13 comprises a main magnetic body 132 and a plurality of secondary magnetic bodies 133 disposed on the periphery of the main magnetic body 132. A first gap 134 exists between the main magnetic body 132 and the plurality of secondary magnetic bodies 133. The voice coil 15 is disposed in the first gap 134. The main magnetic body 132 or/and the plurality of secondary magnetic bodies 133 in the airflow area 1111 comprise the first demagnetization component 131. Wherein, the first demagnetization component 131 of the main magnetic body 132 is a through hole 1311 or/and a notch 1312 disposed at the main magnetic body 132 in the airflow area 1111. Also, the first demagnetization component 131 among the plurality of secondary magnetic bodies 133 reduces the volume of the plurality of secondary magnetic bodies 133 in the airflow area 1111. Besides, the magnetic component 13 is disposed on the carrying board 12, which could be made of a magnetically conductive material. The magnetic component 13 could concentrate magnetic flux by the carrying board 12.

Besides, the magnetic conductive component 14 corresponds to the magnetic component 13. The magnetic conductive component 14 comprises a main magnetic conductive member 142 and a plurality of secondary magnetic conductive members 143. The plurality of secondary magnetic conductive members 143 are disposed at the periphery of the main magnetic conductive member 142. A second gap 144 exists between the main magnetic conductive member 142 and the plurality of secondary magnetic conductive members 143. The voice coil 15 is disposed in the second gap 144. The main magnetic conductive member 142 or/and the plurality of secondary magnetic conductive members 143 in the airflow area 1111 comprise the second demagnetization component 141. Wherein, the second demagnetization component 141 of the main magnetic conductive member 142 is a through hole 1411 or/and a notch 1412 disposed at the main magnetic conductive member 142 in the airflow area 1111. Besides, the second demagnetization component 141 among the plurality of secondary magnetic conductive members 143 reduces the volume of the plurality of secondary magnetic conductive members 143 in the airflow area 1111.

Back to FIG. 5, in this embodiment, the magnetic component 13 comprises a main magnetic body 132 and a plurality of secondary magnetic bodies 133. Wherein, the number of the plurality of secondary magnetic bodies 133 is four. The main magnetic body 132 is rectangular, and the main magnetic body 132 comprises a rectangular through hole 1411 in the airflow area 1111. The four secondary magnetic bodies 133 are disposed corresponding to four side edges of the main magnetic body 132. A first gap 134 exists between the main magnetic body 132 and the four secondary magnetic bodies 133. The gap distance of the first gap 134 is greater than the thickness of the voice coil 15 so that one side of the voice coil 15 is disposed in the first gap 134, and the other side of the voice coil 15 is connected to the diaphragm component 16. Wherein, the diaphragm component 16 comprises a ball top part 161 and a folded ring part 162, the folded ring part 162 is connected to the voice coil 15, and the ball top part 161 is disposed at one side of the folded ring part 162 away from the voice coil 15.

The housing 11 comprises a first casing 113, a second casing 114 and a frame body 115 disposed between the first casing 113 and the second casing 114. In addition to comprising the accommodating space accommodating the carrier plate 12, the magnetic component 13, the magnetic conductive component 14, the voice coil 15, and the diaphragm component 16, the housing 11 further comprises a rear cavity space 112 for electronic component disposing or sound adjusting.

In this embodiment, the area connected to the rear cavity space 112 in the accommodating space 111 is the airflow area 1111. That is, air in the rear cavity space 112 and the accommodating space 111 would communicate, and the accommodating space 111 adjacent to the rear cavity space 112 is the airflow area 1111. In the accommodating space 111, the area other than the airflow area 1111 is the non-airflow area 1112. When an external power source energizes the voice coil 15, it would generate a magnetic field under the electric current. The magnetic field of the voice coil 15 could interact with the magnetic field of the magnetic component 13. Wherein, the magnetic conductive component 14 could concentrate magnetic force lines of the magnetic component 13 to increase magnetic flux of the magnetic component 13. The voice coil 15 could generate vibration orthogonal to electric current direction, and the voice coil 15 drives the diaphragm component 16 to vibrate, thereby generating sound.

According to Fleming's left-hand rule: F=i*B1, where F is the thrust of the voice coil 15, i is the electric current passing the voice coil 15, B is the magnetic flux of the magnetic component 13, and the magnetic conductive component 14, 1 is the total winding length of the voice coil 15, and B1 is the magnetic force conversion factor, which is the product of the magnetic flux B and the total winding length 1. Since the electric current i and the total winding length 1 of each area in the accommodating space 111 (ie, the airflow area 1111 and the non-airflow area 1112) are consistently identical, and the magnetic flux B of the magnetic component 13 and the magnetic conductive component 14 in the areas having same size are also consistently identical, the magnitude of the thrust F exerted is also identical. However, the voice coil 15 disposed in the airflow area 1111 is affected by the airflow in the rear cavity space 112 to generate resonance, so the vibration amplitude of the voice coil 15 in the airflow area 1111 is greater than that of the voice coil in the non-airflow area 1112. In this way, an imbalance in the overall vibration amplitude of the voice coil 15 would affect the acoustic performance.

In this embodiment, the first demagnetization component 131 is disposed at the main magnetic body 132 of the magnetic component 13 in the airflow area 1111. Wherein, the first demagnetization component 131 is a through hole 1311, that is, the main magnetic body 132 is provided with a through hole 1311 to reduce the magnetic flux of the main magnetic body 132 in the airflow area 1111. That is, when the size of the airflow area 1111 and the size of the non-airflow area 1112 are identical, the magnetic flux of the magnetic component 13 and of the magnetic conductive component 14 in the airflow area 1111 is smaller than the magnetic flux of the non-airflow area 1112. So, the thrust F of the voice coil 15 in the airflow area 1111 can be reduced, and the vibration amplitude of the voice coil 15 and of the diaphragm component 16 can be further reduced. In this way, the vibration amplitude of the voice coil 15 in each area in the accommodating space 111 can be balanced for high-quality acoustic performance.

Figure 6:
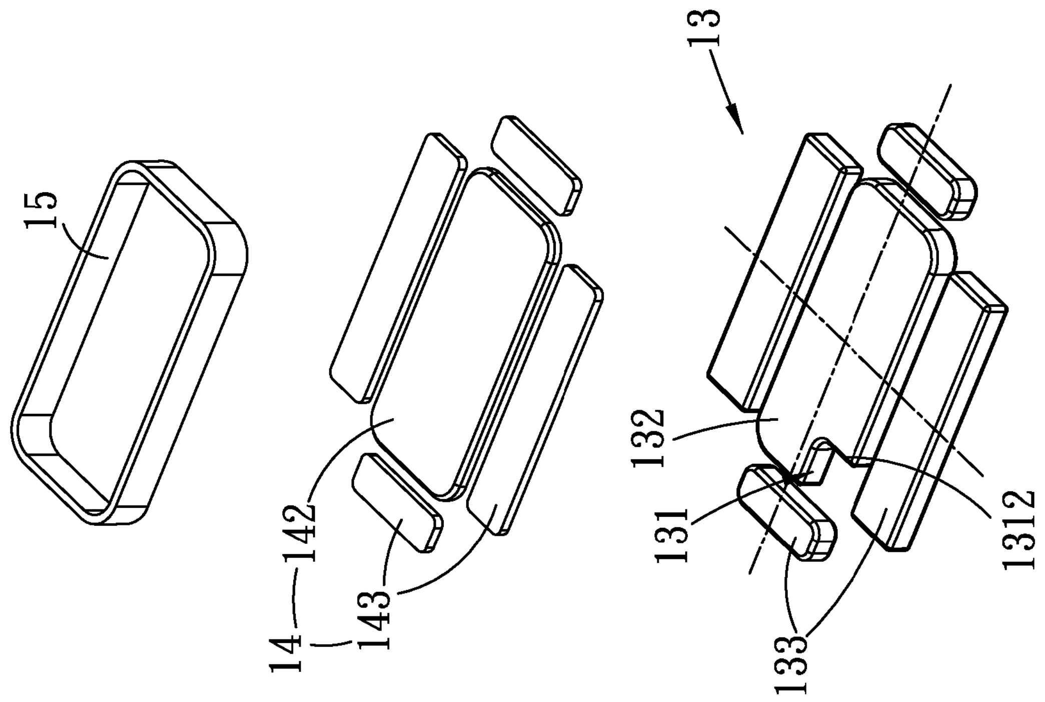
FIG. 6 is a perspective view of internal components of a speaker of the second embodiment of the present disclosure.

FIG. 6 is a perspective view of internal components of a speaker of the second embodiment of the present disclosure. As shown in the figure, the difference between this embodiment and the first embodiment lies in the structural configuration of the first demagnetization component 131. The first demagnetization component 131 is a notch 1312 disposed at the main magnetic body 132 in the airflow area 1111. In this embodiment, the magnetic flux of the main magnetic body 132 in the airflow area 1111 could be reduced by the notch 1312, and the vibration amplitude of the voice coil 15 in the airflow area 1111 could be further reduced.

Figure 7:
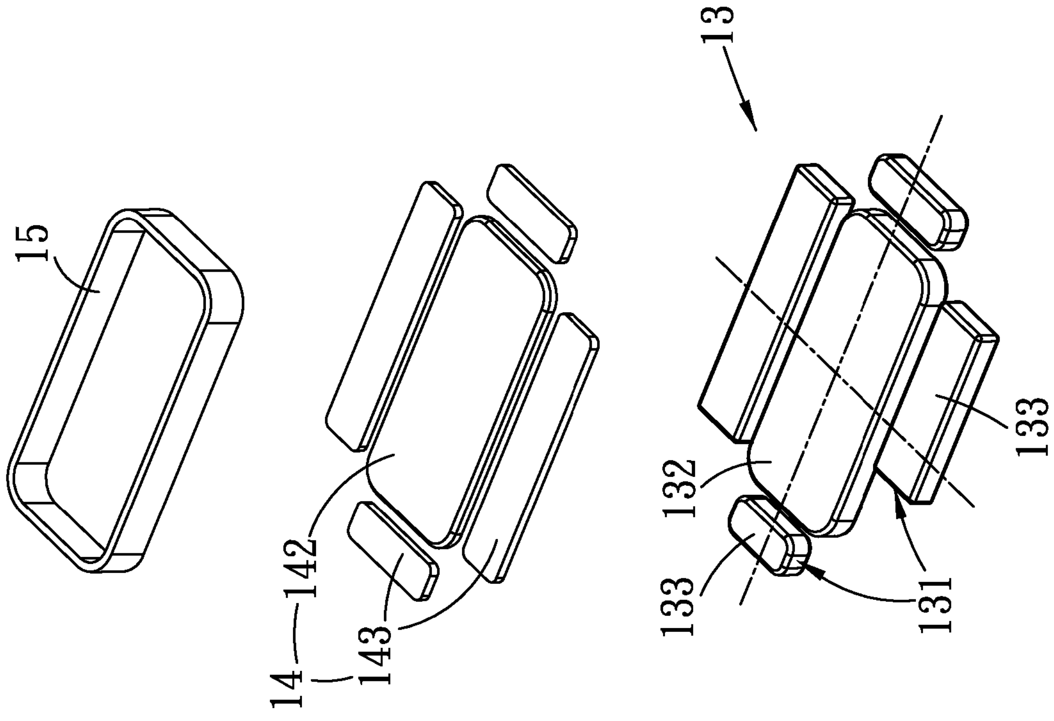
FIG. 7 is a perspective view of internal components of a speaker of the third embodiment of the present disclosure.

FIG. 7 is a perspective view of internal components of a speaker of the third embodiment of the present disclosure. The difference between this embodiment and the first embodiment lies in the structural configuration and arrangement position of the first demagnetization component 131. In this embodiment, the first demagnetization component 131 could reduce the volume of the plurality of secondary magnetic bodies in the airflow area 1111. Wherein, the number of the secondary magnetic bodies 133 is four, and the four secondary magnetic bodies 133 correspond to two long side edges and two short side edges of the main magnetic body 132 respectively. In the airflow area 1111, a secondary magnetic body 133 at a long side edge and a secondary magnetic body 133 at a short side could reduce the volume of the secondary magnetic body 133 at the long side edge or/and the volume of the secondary magnetic body 133 at the short side edge in the airflow area 1111. In this way, the magnetic flux of the secondary magnetic body 133 in the airflow area 1111 can be reduced, and the vibration amplitude of the voice coil 15 in the airflow area 1111 can hence be reduced. In this embodiment, the volume of the secondary magnetic body 133 at the long side edge or/and of the secondary magnetic body 133 at the short side edge in the airflow area 1111 can be reduced according to requirements for adjusting magnetic flux.

Figure 8:
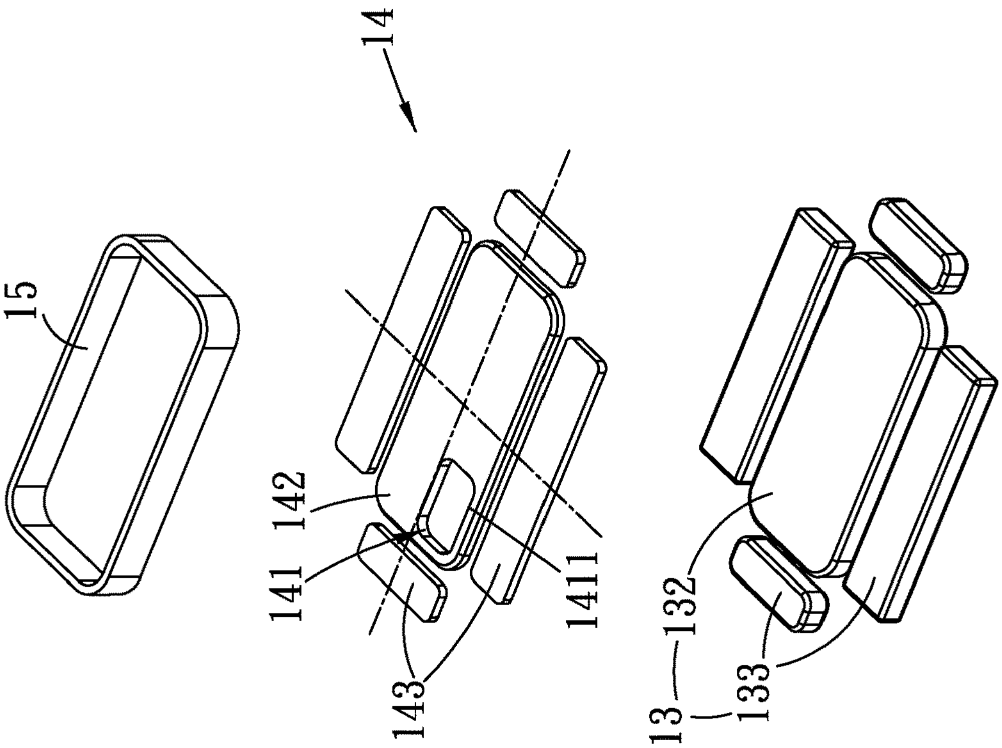
FIG. 8 is a perspective view of internal components of a speaker of the fourth embodiment of the present disclosure.

FIG. 8 is a perspective view of internal components of a speaker of the fourth embodiment of the present disclosure. As shown in the figure, the difference between this embodiment and the first embodiment lies in the arrangement position of the through hole, where this embodiment is implemented mainly for the magnetic conductive component 14. The second demagnetization component 141 is a through hole 1411 disposed at the main magnetic conductive member 142 in the airflow area 1111. In this embodiment, magnetic flux of the main magnetic conductive member 142 in the airflow area 1111 is reduced by the through hole 1411, thereby reducing the vibration amplitude of the voice coil 15 in the airflow area 1111.

Figure 9:
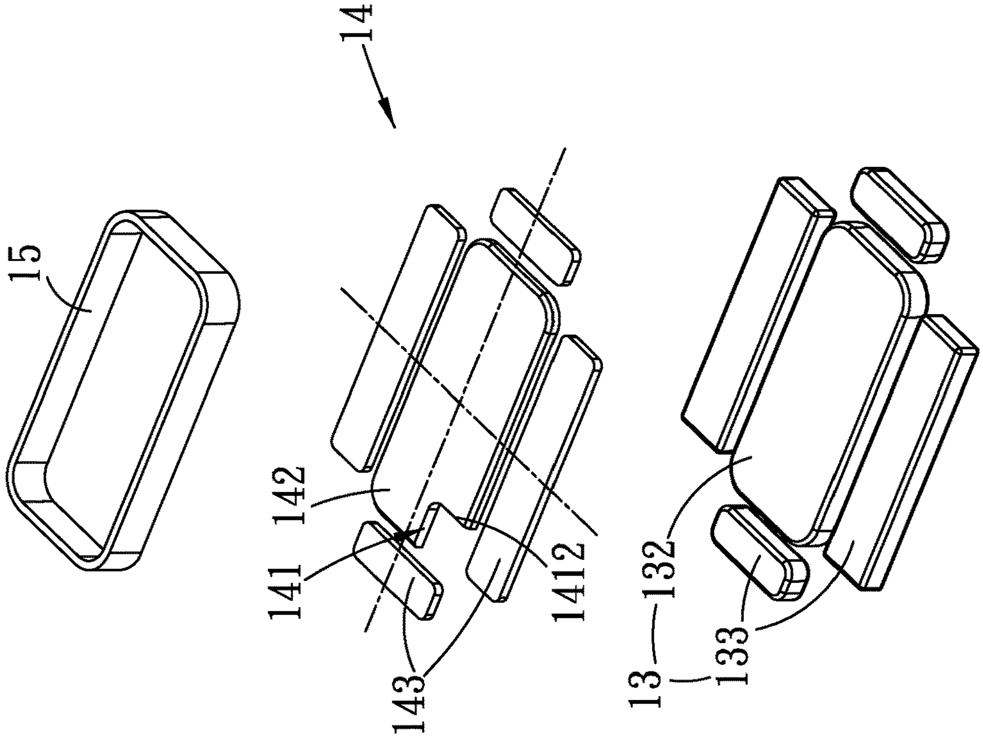
FIG. 9 is a perspective view of internal components of a speaker of the fifth embodiment of the present disclosure.

FIG. 9 is a perspective view of internal components of a speaker of the fifth embodiment of the present disclosure. As shown in the figure, the difference between this embodiment and the fourth embodiment lies in the structural configuration of the second demagnetization component 141. The second demagnetization component 141 is a notch 1412 disposed at the main magnetic conductive member 142 in the airflow area 1111. In this embodiment, magnetic flux of the main magnetic conductive member 142 in the airflow area 1111 is reduced by the notch 1412, thereby reducing the vibration amplitude of the voice coil 15 in the airflow area 1111.

Figure 10:
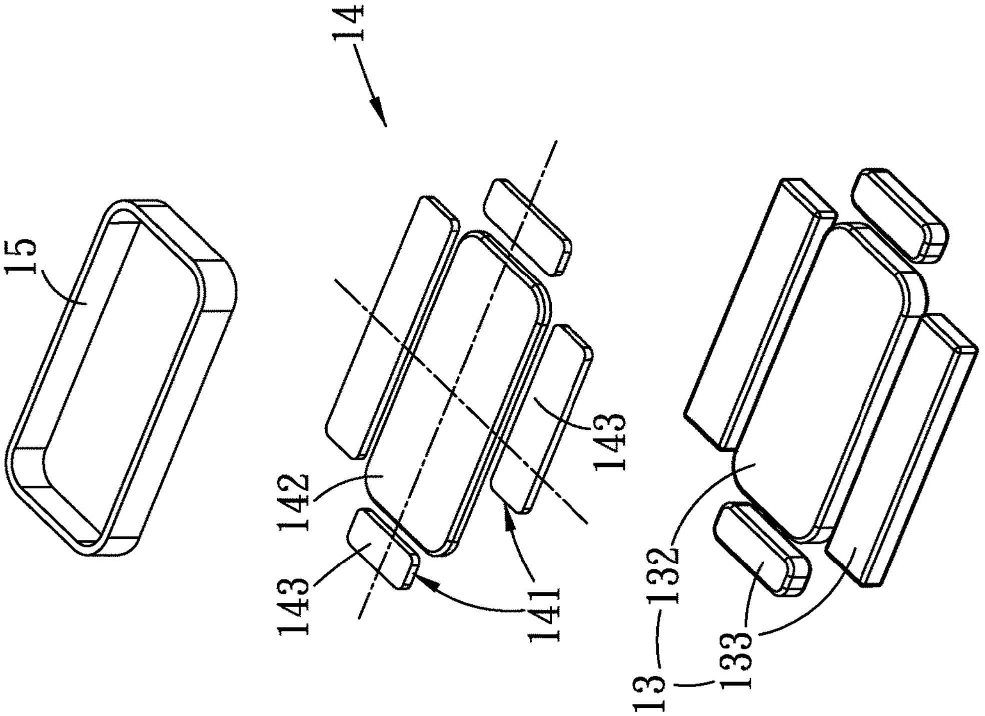
FIG. 10 is a perspective view of internal components of a speaker of the sixth embodiment of the present disclosure.

FIG. 10 is a perspective view of internal components of a speaker of the sixth embodiment of the present disclosure. As shown in the figure, the difference between this embodiment and the fourth embodiment lies in the second demagnetization component 141, which reduces the volume of the plurality of secondary magnetic conductive members 143 in the airflow area 1111. Wherein, the number of the secondary magnetic conductive members 143 is four, the four secondary magnetic conductive members 143 correspond to two long side edges and two short side edges of the main magnetic conductive member 142, respectively. In the airflow area 1111, a secondary magnetic conductive member 143 having a long side edge and a short side edge could reduce the volume of the secondary magnetic conductive member 143 at the long side edge or/and the volume of the secondary magnetic conductive member 143 at the short side edge in the airflow area 1111. In this way, magnetic flux of the secondary magnetic conductive member 143 in the airflow area 1111 could be reduced, thereby reducing the vibration amplitude of the voice coil 15 in the airflow area 1111. In this embodiment, the volume of the secondary magnetic conductive members 143 at corresponding long side edge or short side edge in the airflow area 1111 could be reduced to adjust magnetic flux according to requirements.

Figure 11:
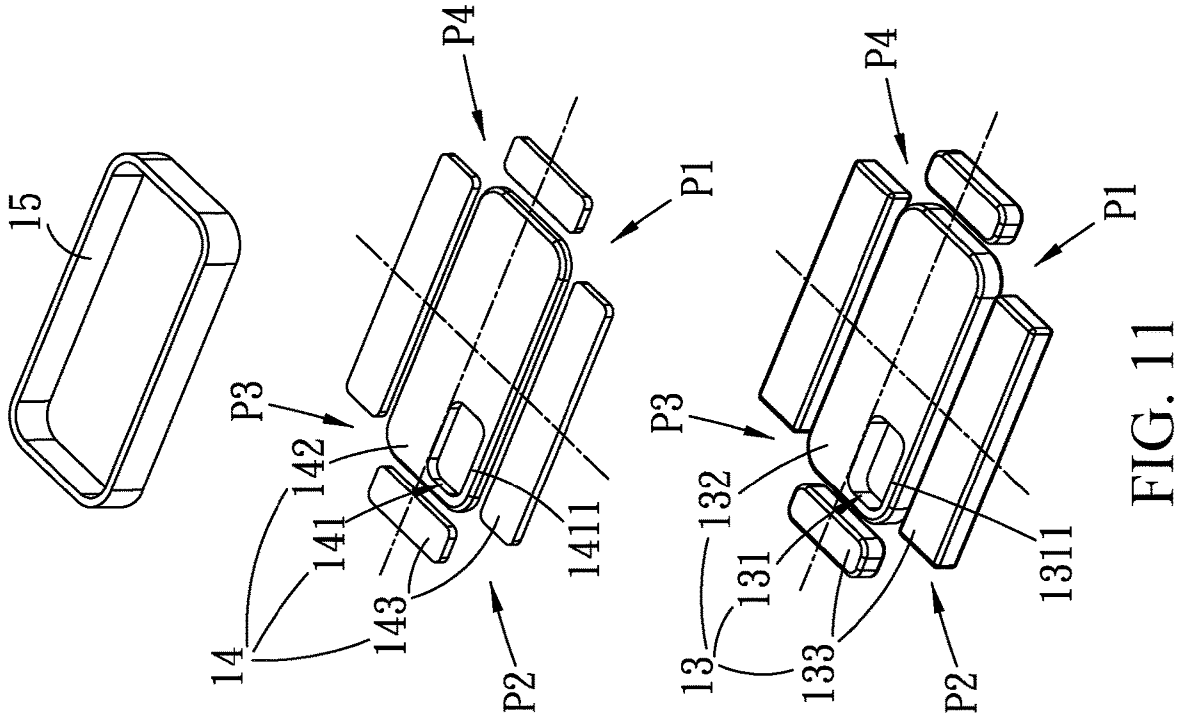
FIG. 11 is a perspective view of internal components of a speaker of the seventh embodiment of the present disclosure.

FIG. 11 is a perspective view of internal components of a speaker of the seventh embodiment of the present disclosure. As shown in the figure, this embodiment is a combination of the first embodiment and the fourth embodiment, where the first demagnetization component 131 is a through hole 1311, and the second demagnetization component 141 is a through hole 1411. The through hole 1411 of the second demagnetization component 141 of this embodiment corresponds to the through hole 1311 of the first demagnetization component 131, that is, the through hole 1411 of the second demagnetization component 141 communicates with the through hole 1311 of the first demagnetization component 131. The purpose of the structural configuration and function of this embodiment is to reduce magnetic flux of the magnetic component 13 and the magnetic conductive component 14 in the airflow area 1111, thereby reducing the vibration amplitude of the voice coil 15 in the airflow area 1111.

Figure 12:
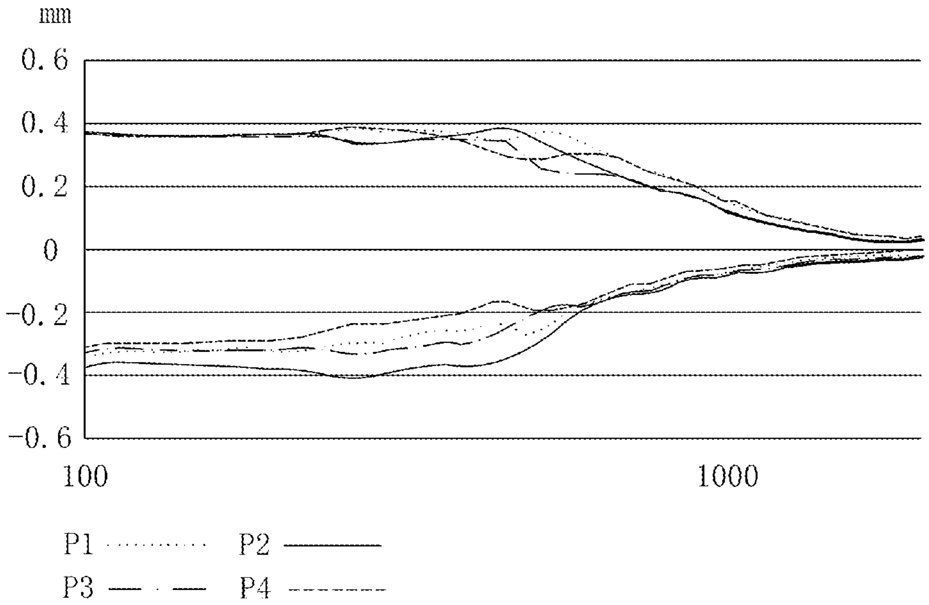
FIG. 12 is a linear diagram showing the vibration amplitude of voice coil and diaphragm component of prior arts.

FIG. 12 is a linear diagram showing the vibration amplitude of voice coil and diaphragm component of prior arts. As shown in the figure, when a conventional speaker is powered on, the magnetic component and the magnetic conductive component are segmented into four areas P1, P2, P3, and P4 for description, where magnetic flux of P1, P2, P3, and P4 are respectively detected as P1: 0.659, P2: 0.657, P3: 0.658 and P4: 0.659. In the case that the structural configuration of the above-mentioned magnetic components and magnetic conductive components are not changed, differences among the magnetic flux in each area would not be significant and detected magnetic flux would act on the voice coil. The vibration amplitude of each voice coil is shown in FIG. 12, and it is obvious that the lines representing the vibration amplitude of each area do not overlap. That is to say, there is a large difference among the vibration amplitudes, so the imbalance between the vibration amplitudes of the voice coil and of the diaphragm component would affect the acoustic performance of the speaker.

Figure 13:
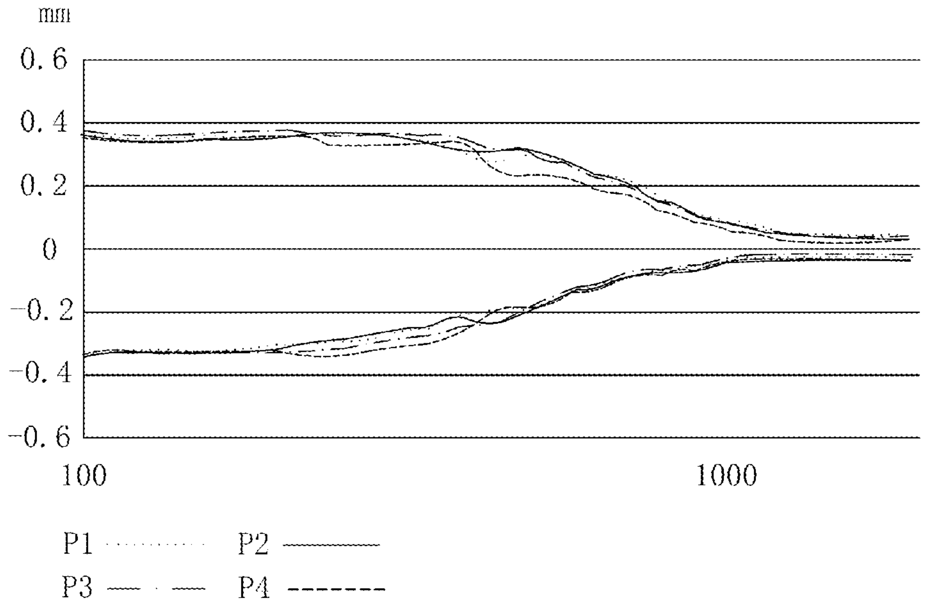
FIG. 13 is a linear diagram of vibration amplitude of voice coil and diaphragm component in the speaker of the seventh embodiment of the present disclosure.

FIG. 13 is a linear diagram of vibration amplitude of the voice coil and diaphragm component in the speaker of the seventh embodiment of the present disclosure. As shown in the figure, in the seventh embodiment, the structural configuration of the magnetic component 13 and the magnetic conductive component 14 are changed. P1 is the airflow area 1111, and P2, P3, and P4 are non-airflow areas 1112, where the magnetic flux of P1, P2, P3, and P4 are detected as P1: 0.665, P2: 0.604, P3: 0.656 and P4: 0.664, respectively. Wherein, magnetic flux values of the unchanged P1, P3 and P4 are relatively similar, while the value of P2 corresponding to the airflow area 1111 is relatively low. That is, the magnetic flux of P2 can be significantly reduced by the first demagnetization component 131. Furthermore, the vibration amplitude of each voice coil is shown in FIG. 13. Compared with FIG. 12, it can be clearly seen that the lines representing the vibration amplitude of each area in FIG. 13 overlap. That is, the difference in the vibration amplitudes is reduced so that the balance of the vibration amplitude of the voice coil 13 and the diaphragm component would improve the acoustic performance of the speaker.

Figure 14:
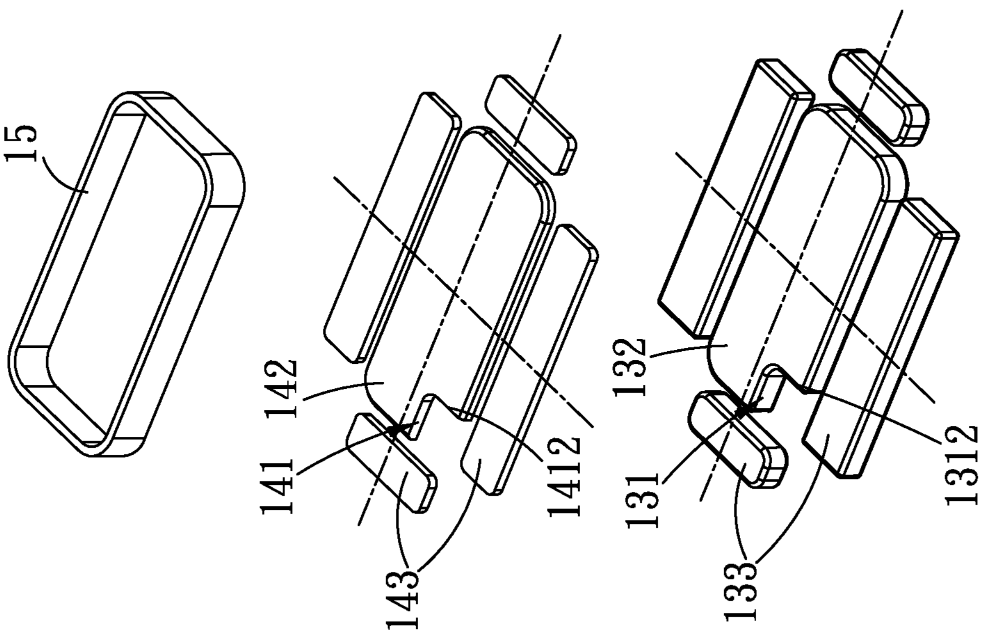
FIG. 14 is a perspective view of internal components of a speaker of the eighth embodiment of the present disclosure.

FIG. 14 is a perspective view of internal components of a speaker of the eighth embodiment of the present disclosure. As shown in the figure, this embodiment is a combination of the second embodiment and the fifth embodiment, where the first demagnetization component 131 is a notch 1312, and the second demagnetization component 141 is a notch 1412. The notch 1412 of the second demagnetization component 141 in this embodiment corresponds to the notch 1312 of the first demagnetization component 131. The purpose of the structural configuration and function of this embodiment is to reduce magnetic flux of the magnetic component 13 and the magnetic conductive component 14 in the airflow area 1111, thereby reducing the vibration amplitude of the voice coil 15 in the airflow area 1111. Besides, in this embodiment, after the structural configurations of the magnetic component 13 and the magnetic conductive component 14 are changed, the magnetic flux of P1, P2, P3, and P4 are detected as P1: 0.663, P2: 0.509, P3: 0.657 and P4: 0.66, respectively.

Figure 15:
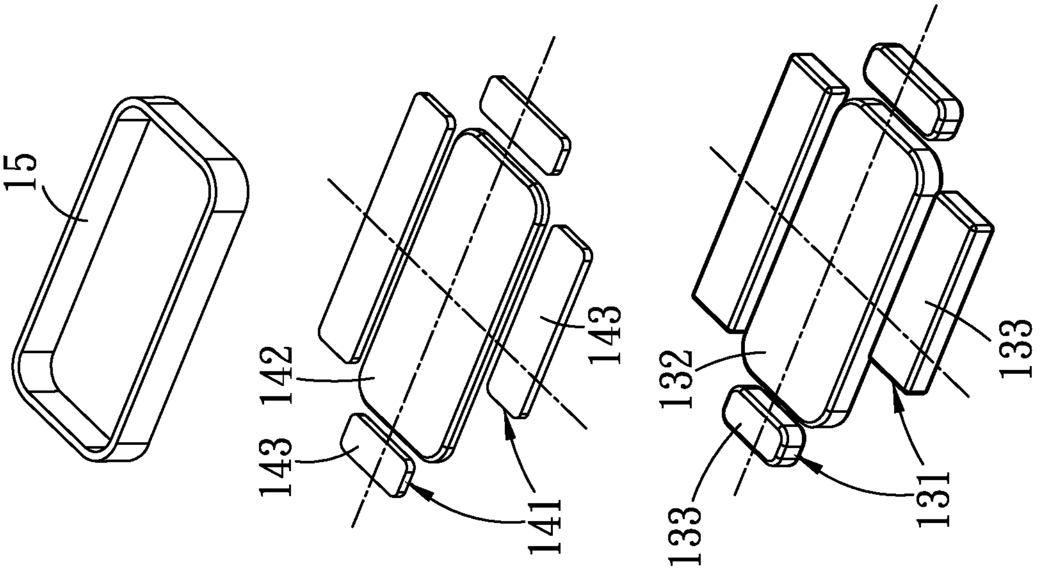
FIG. 15 is a perspective view of internal components of a speaker of the ninth embodiment of the present disclosure.

FIG. 15 is a perspective view of internal components of a speaker of the ninth embodiment of the present disclosure. As shown in the figure, this embodiment is a combination of the third embodiment and the sixth embodiment, where the first demagnetization component 131 could reduce the volume of the secondary magnetic body 133 at the long side edge or/and the secondary magnetic body 133 at the short side edge in the airflow area 1111, and the second demagnetization component 141 could reduce the volume of the secondary magnetic conductive member 143 at the long side edge or/and the volume of the secondary magnetic conductive member 143 at the short side edge in the airflow area 1111. The above method can be selected according to requirements to reduce the at least one secondary magnetic body 133 and the at least one secondary magnetic conductive member 143. In this way, magnetic flux of the secondary magnetic body 133 and of the secondary magnetic conductive member 143 in the airflow area 1111 can be reduced, thereby reducing the vibration amplitude of the voice coil 15 in the airflow area 1111. Besides, in this embodiment, after the structural configurations of the magnetic component 13 and the magnetic conductive component 14 are changed, magnetic flux of P1, P2, P3, and P4 are detected as P1: 0.662, P2: 0.493, P3: 0.665 and P4: 0.663, respectively.

Figure 16:
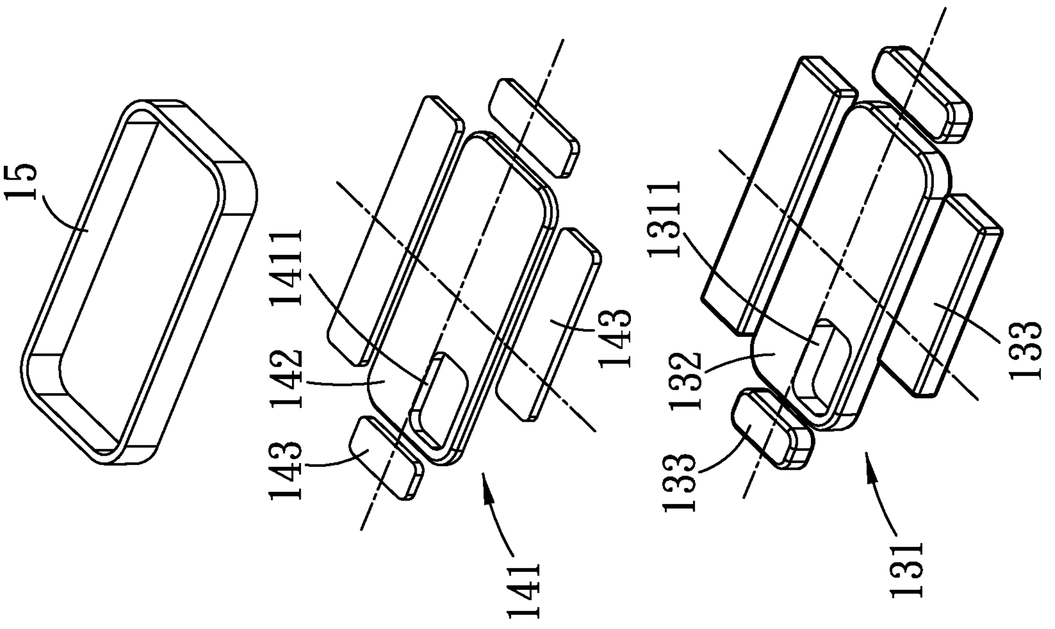
FIG. 16 is a perspective view of internal components of a speaker of the tenth embodiment of the present disclosure.

FIG. 16 is a perspective view of internal components of a speaker of the tenth embodiment of the present disclosure. As shown in the figure, this embodiment is a combination of the seventh embodiment and the ninth embodiment, where the first demagnetization component 131 is a through hole 1311, which could reduce the volume of the secondary magnetic body 133 at the long side edge and/or the volume of the secondary magnetic body 133 on the short side edge in the airflow area 1111. The second demagnetization component 141 is a through hole 1411, which could reduce the volume of the secondary magnetic conductive member 143 at the long side edge or/and the volume of the secondary magnetic conductive member 143 at the short side edge in the airflow area 1111. In this way, magnetic flux of the secondary magnetic body 133 and the secondary magnetic conductive member 143 in the airflow area 1111 can be reduced, thereby reducing the vibration amplitude of the voice coil 15 in the airflow area 1111.

Figure 17:
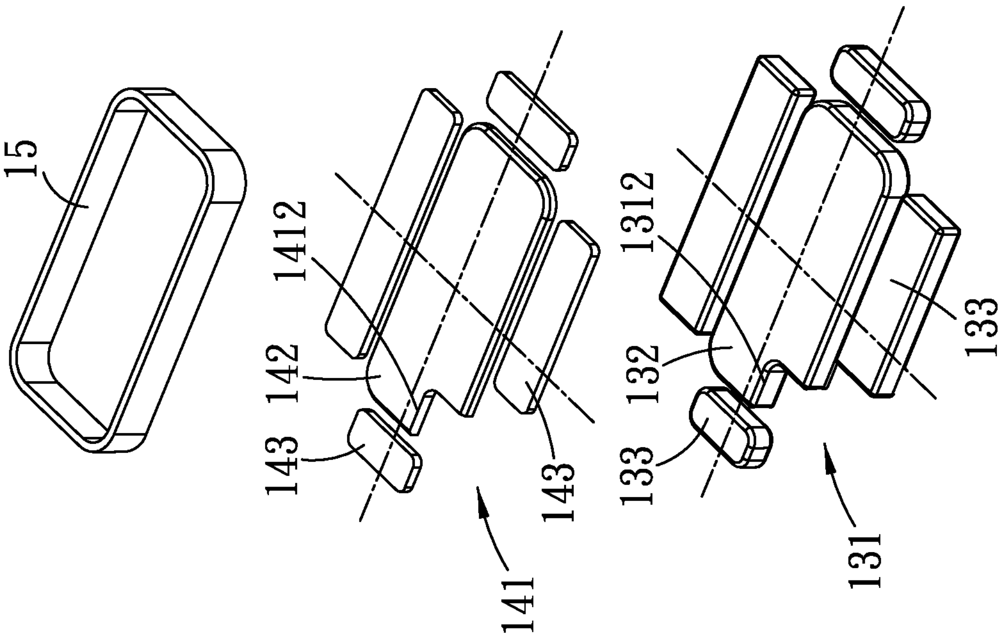
FIG. 17 is a perspective view of internal components of a speaker of the eleventh embodiment of the present disclosure.

FIG. 17 is a perspective view of internal components of a speaker of the eleventh embodiment of the present disclosure. As shown in the figure, this embodiment is a combination of the eighth embodiment and the ninth embodiment, where the first demagnetization component 131 is a notch 1312, which could reduce the volume of the secondary magnetic body 133 at the long side edge or/and the volume of the secondary magnetic body 133 at the short side edge in the airflow area 1111, and the second demagnetization component 141 is a notch 1412, which could reduce the volume of the secondary magnetic conductive member 143 at the long side edge or/and the volume of the secondary magnetic conductive member 143 at the short side edge in the airflow area 1111. In this way, magnetic flux of the secondary magnetic body 133 and the secondary magnetic conductive member 143 in the airflow area 1111 can be reduced, thereby reducing the vibration amplitude of the voice coil 15 in the airflow area 1111.

In summary, the present disclosure provides a speaker, the housing of which comprises an accommodating space and a rear cavity space. The accommodating space is communicated with the rear cavity space. An area in the accommodating space communicating with the rear cavity space is an airflow area. The accommodating space accommodates the magnetic component, the magnetic conductive component, the voice coil, and the diaphragm component. Wherein, the magnetic component disposed in the airflow area comprises a first demagnetization configuration or/and the magnetic conductive component disposed in the airflow area comprises a second demagnetization component. In this embodiment, the vibration amplitude of each area of the voice coil could be balanced by reducing magnetic flux of the magnetic conductive component and of the magnetic component in the airflow area by the first demagnetization component and the second demagnetization component for excellent acoustic performance.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A speaker, comprising:
- a housing comprising an accommodating space and a rear cavity space, the accommodating space being communicated with the rear cavity space, an area in the accommodating space communicating with the rear cavity space being an airflow area;
- a carrying board disposed in the accommodating space;
- a magnetic component disposed on the carrying board;
- a magnetic conductive component disposed at the magnetic component;
- a voice coil disposed in the magnetic component and the magnetic conductive component; and
- a diaphragm component disposed in the accommodating space, the diaphragm component being connected to the voice coil;
- wherein, the magnetic component disposed in the airflow area comprises a first demagnetization configuration or/and the magnetic conductive component disposed in the airflow area comprises a second demagnetization component;
- wherein an area outside the airflow area of the accommodating space is a non-airflow area; wherein when the airflow area and the non-airflow area have the same size, a magnetic flux of the magnetic component and the magnetic conductive component disposed in the airflow area is smaller than a magnetic flux of the non-airflow area.

2. The speaker according to claim 1, wherein the magnetic component comprises a main magnetic body and a plurality of secondary magnetic bodies disposed on the periphery of the main magnetic body; a first gap exists between the main magnetic body and the plurality of secondary magnetic bodies; the voice coil is disposed in the first gap; at least one of the main magnetic body or/and the plurality of secondary magnetic bodies in the airflow area comprises the first demagnetization component.

3. The speaker according to claim 2, wherein the first demagnetization component of the main magnetic body is a through hole or/and a notch disposed at the main magnetic body in the airflow area.

4. The speaker according to claim 2, wherein the first demagnetization component among the plurality of secondary magnetic bodies reduces the volume of the plurality of secondary magnetic bodies in the airflow area.

5. The speaker according to claim 1, wherein the magnetic conductive component corresponds to the magnetic component; the magnetic conductive component comprises a main magnetic conductive member and a plurality of secondary magnetic conductive members; the plurality of secondary magnetic conductive members are disposed on the periphery of the main magnetic conductive member; a second gap exists between the main magnetic conductive member and the plurality of secondary magnetic conductive members; the voice coil is disposed in the second gap; at least one of the main magnetic conductive member and the plurality of secondary magnetic conductive members in the airflow area comprises the second demagnetization component.

6. The speaker according to claim 5, wherein the second demagnetization component of the main magnetic conductive member is a through hole or/and a notch disposed at the main magnetic conductive member in the airflow area.

7. The speaker according to claim 5, wherein the second demagnetization component among the plurality of secondary magnetic conductive members reduces the volume of the plurality of secondary magnetic conductive members in the airflow area.

8. The speaker according to claim 1, wherein the first demagnetization component corresponds to the second demagnetization component.

9. The speaker according to claim 1, wherein the diaphragm component comprises a ball top part and a folded ring part; the folded ring part is connected to the voice coil; the ball top part is disposed at one side of the folded ring part away from the voice coil.

* * * * *